US008015818B2

(12) United States Patent
Wilson et al.

(10) Patent No.: US 8,015,818 B2
(45) Date of Patent: Sep. 13, 2011

(54) COOLED TRANSITION DUCT FOR A GAS TURBINE ENGINE

(75) Inventors: Jody W. Wilson, Winter Springs, FL (US); Raymond Scott Nordlund, Orlando, FL (US); Adam Weaver, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1684 days.

(21) Appl. No.: 11/062,970

(22) Filed: Feb. 22, 2005

(65) Prior Publication Data

US 2006/0185345 A1 Aug. 24, 2006

(51) Int. Cl.
*F02C 1/00* (2006.01)

(52) U.S. Cl. ................................ 60/755; 60/752; 60/757

(58) Field of Classification Search ............ 60/752–760; 72/51; 228/151–153, 146–147
See application file for complete search history.

(56) References Cited

U.S. PATENT DOCUMENTS 3,750,398 A * 8/1973 Adelizzi et al. .............. 60/39.37
4,016,718 A 4/1977 Lauck
4,195,474 A 4/1980 Bintz et al.
4,413,470 A 11/1983 Scheihing et al.
4,422,288 A 12/1983 Steber
4,719,748 A 1/1988 Davis, Jr. et al.
4,819,438 A 4/1989 Schultz
4,903,477 A 2/1990 Butt
5,237,813 A 8/1993 Harris et al.
5,761,898 A 6/1998 Barnes et al.
5,826,430 A 10/1998 Little
5,906,093 A 5/1999 Coslow et al.
5,960,632 A 10/1999 Abuaf et al.
6,085,514 A 7/2000 Benim et al.
6,109,019 A 8/2000 Sugishita
6,116,013 A 9/2000 Moller
6,116,018 A 9/2000 Tanimura et al.
6,298,656 B1 10/2001 Donovan et al.
6,345,494 B1 2/2002 Coslow
6,412,268 B1 * 7/2002 Cromer et al. .................. 60/772
6,450,762 B1 9/2002 Munshi
6,463,742 B2 10/2002 Mandai et al.
6,523,352 B1 2/2003 Takahashi et al.
6,546,627 B1 4/2003 Sekihara et al.
6,568,187 B1 5/2003 Jorgensen et al.
6,619,915 B1 9/2003 Jorgensen et al.
6,644,032 B1 11/2003 Jorgensen et al.
2002/0112483 A1 8/2002 Kondo et al.
2003/0140633 A1 7/2003 Shimizu et al.
2003/0167776 A1 9/2003 Coppola
2003/0192320 A1 10/2003 Farmer et al.

FOREIGN PATENT DOCUMENTS

GB 2 087 066 A 5/1982

(Continued)

*Primary Examiner* — Michael Cuff
*Assistant Examiner* — Gerald L Sung

(57) ABSTRACT

A transition duct (30) for a gas turbine engine (2) having improved cooling and reduced stress levels. The transition duct may be formed of two panels ((36, 38) joined together with welds (40) disposed remote from the bent corner regions (34) of the panels. Cooling channels (32) extending longitudinally in the direction of flow of the hot combustion gas carried by the duct are formed within each panel, including the corner regions. Because the entire annular width (W) of the transition duct is cooled, the gap (G) separating adjacent ducts around the inlet to the turbine (4) may be reduced when compared to prior art designs. Two-panel construction with welds remote from the corner regions is facilitated by maintaining the minimum bend radius in the corners ($R_2$) and in the direction of flow ($R_4$) to be greater than in prior art designs.

14 Claims, 3 Drawing Sheets

FOREIGN PATENT DOCUMENTS

| | | | |
|---|---|---|---|
| JP | 62176448 | A | 3/1987 |
| JP | 62150543 | A | 4/1987 |
| JP | 03030540 | A | 8/1991 |
| JP | 2001271655 | A | 10/2001 |
| JP | 2003193866 | A | 7/2003 |
| JP | 2004060574 | A | 2/2004 |

* cited by examiner

COOLED TRANSITION DUCT FOR A GAS TURBINE ENGINE

FIELD OF THE INVENTION

This invention relates generally to the field of gas (combustion) turbine engines, and more particularly to a transition duct connecting a combustor and a turbine in a gas turbine engine.

BACKGROUND OF THE INVENTION

The transition duct (transition member) 1 of a gas turbine engine 2 (FIG. 6) is a complex and critical component. The transition duct 1 serves multiple functions, the primary function being to duct hot combustion gas from the outlet of a combustor 3 to an inlet of a turbine 4 within the engine casing 5. The transition duct also serves to form a pressure barrier between compressor discharge air 6 and the hot combustion gas 7. The transition duct is a contoured body required to have a generally cylindrical geometry at its inlet for mating with the combustor outlet and a generally rectangular geometry at its exit for mating with an arcuate portion of the turbine inlet nozzle. The high temperature of the combustion gas imparts a high thermal load on the transition member and thus the transition ducts of modern gas turbine engines are typically actively cooled. Transition members may be cooled by effusion cooling, wherein small holes formed in the duct wall allow a flow of compressor discharge air to leak into the hot interior of the transition member, thereby creating a boundary layer of relatively cooler air between the wall and the combustion gas. Other designs may utilize a closed or regenerative cooling scheme wherein a cooling fluid such as steam, air or liquid is directed through cooling channels formed in the transition member wall. One such prior art steam-cooled transition duct 10 is illustrated in FIG. 1, where it can be seen that the generally circular inlet end 12 converts to a generally rectangular outlet end 14 along the length of flow of the combustion gas carried within the transition member 10. The axis of flow of the combustion gas is also curved as the combustion gas flow is redirected to be parallel to an axis of rotation of the turbine shaft (not shown). The corners of the transition duct 10 tend to be highly stressed, particularly the corners 16 proximate the outlet end 14 due to the combination of the corner geometry and a higher gas velocity due to a reducing duct flow area and turning effects. One prior art approach to address these highly stressed regions is the use of a highly engineered and specific duct profile, such as is described in U.S. Pat. No. 6,644,032. Such approaches may not be desired because they reduce the available design options.

The manufacturing process used to form the component further exacerbates the stress concentration in the corners of the transition duct 10. Prior art transition members are formed by welding together a plurality of panels that have been pre-formed to a desired curved shape. FIG. 2 is a cross-sectional view of the prior art steam-cooled transition duct 10 illustrating how the component is formed by joining four individual panels 18, 20, 22, 24 with respective welds 26. The welds 26 are located in the corners in order to minimize forming strains and wall thinning/thickening when the panels are bent. However, the placement of the welds 26 in the corners precludes the location of cooling channels 28 in the corners, and adjacent channels must be spaced far enough from the welds 26 to ensure that their functionality is not compromised during welding. The corners are thus poorly cooled.

DETAILED DESCRIPTION OF THE INVENTION

Figure 1:
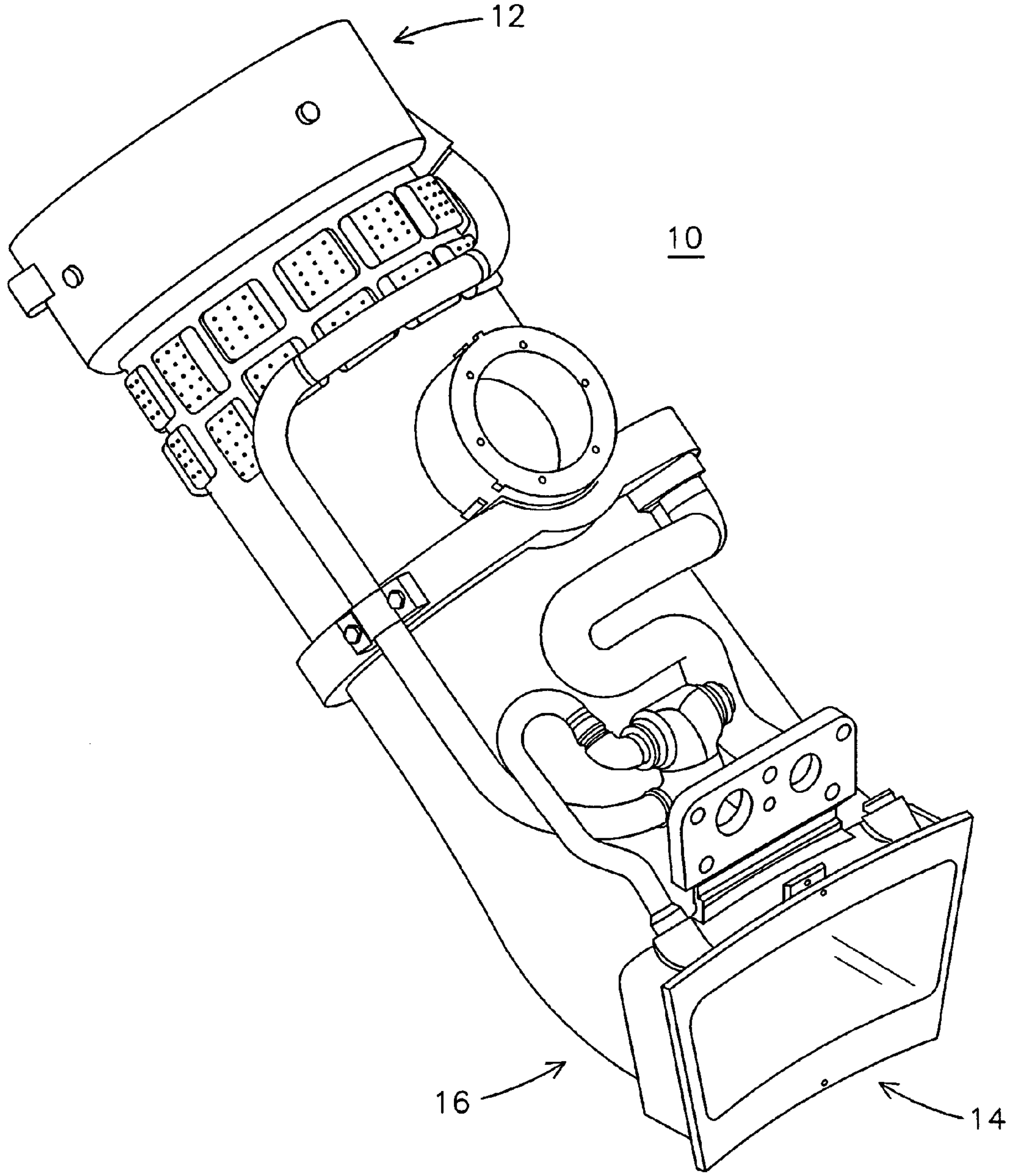
FIG. 1 PRIOR ART
FIG. 1 is a perspective view of a prior art steam-cooled transition duct.
Figure 2:
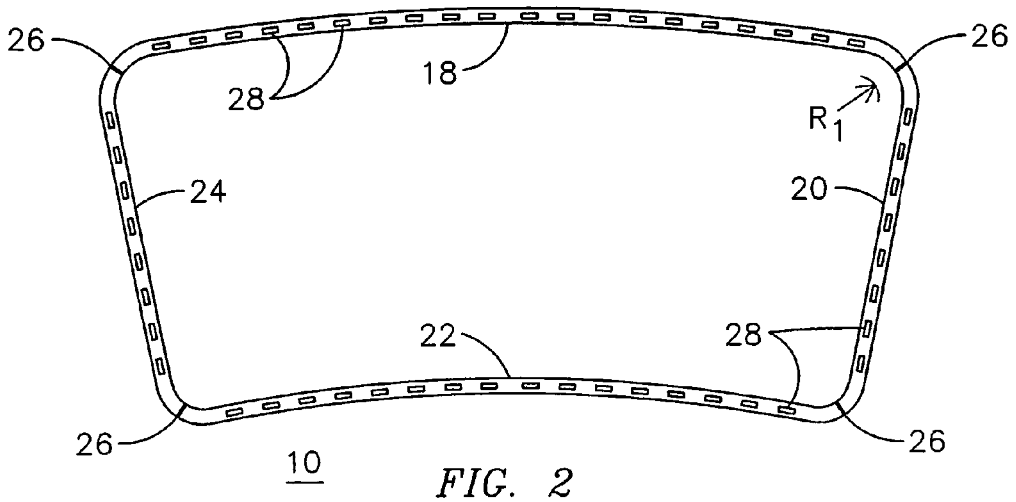
FIG. 2 PRIOR ART
FIG. 2 is a cross-sectional view of the prior art steam-cooled transition duct.
Figure 3:
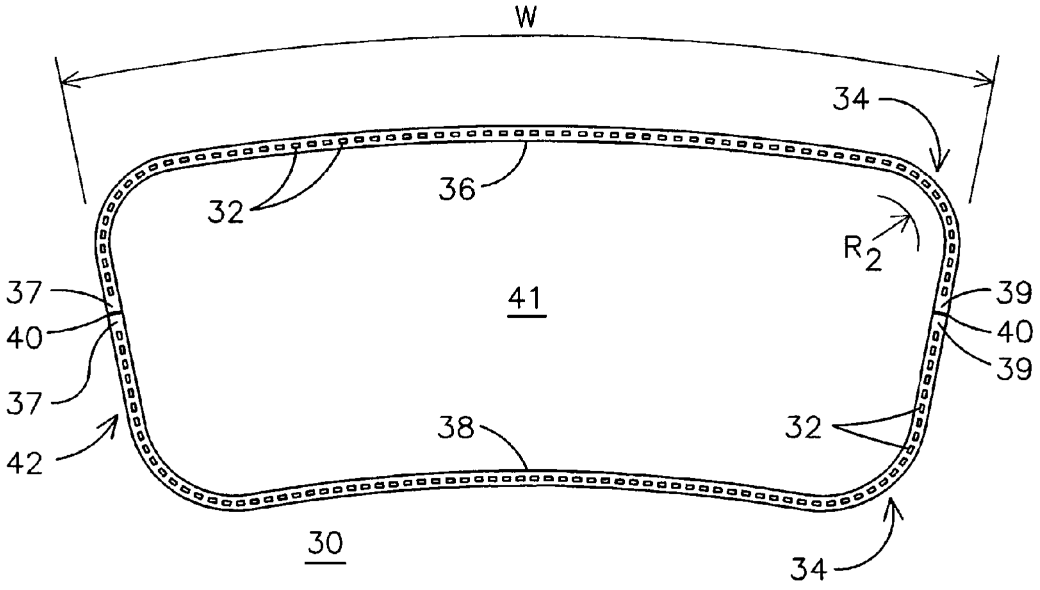
FIG. 3 is a cross-sectional view of one transition duct built in accordance with the present invention.
Figure 4A:
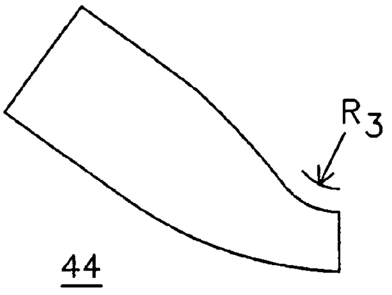
FIG. 4A PRIOR ART
FIG. 4A is a side view of a prior art transition duct.
Figure 4B:
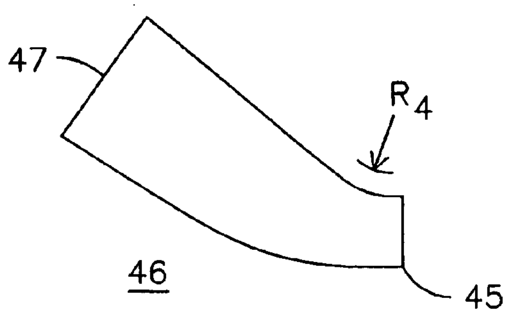
FIG. 4B is a side view of one transition duct built in accordance with the present invention.
Figure 5:
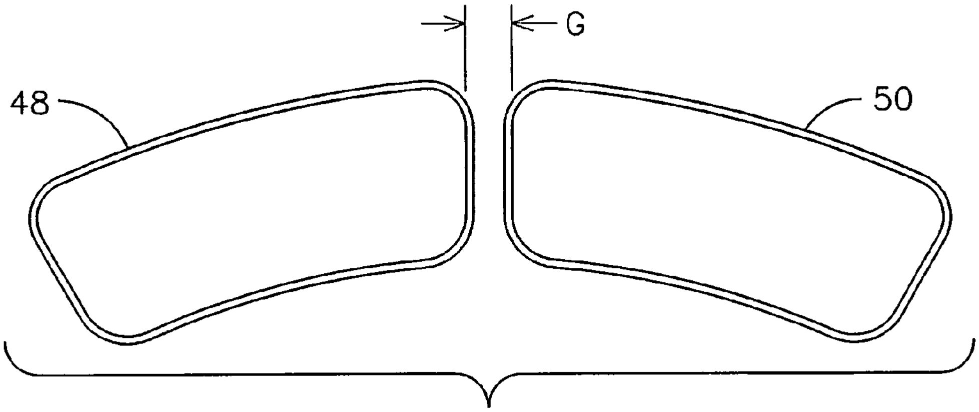
FIG. 5 is an end view illustrating the gap G between the two adjacent transition ducts.
Figure 6:
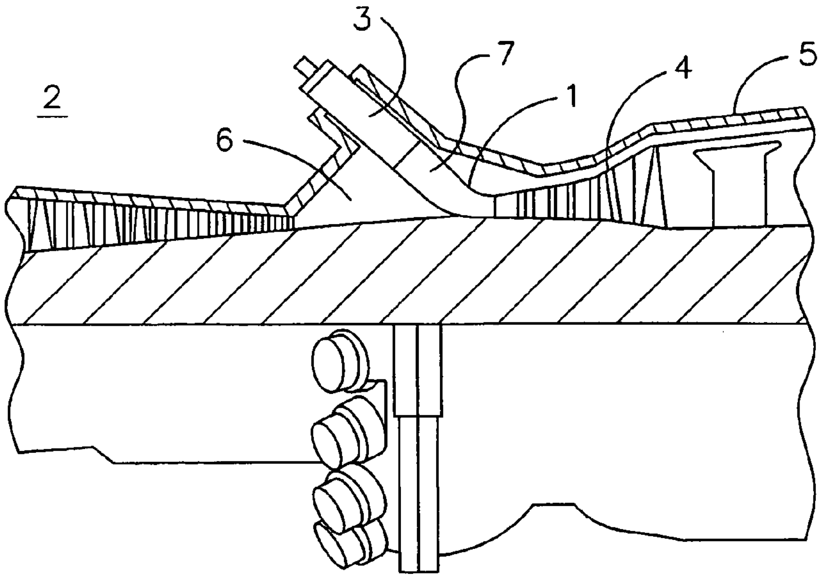
FIG. 6 is a sectional view of a gas turbine engine.

One embodiment of a transition duct 30 built in accordance with the present invention is shown in cross-sectional view of FIG. 3. The transition duct 30 is designed so that there are subsurface cooling channels 32 located directly in the corner regions 34 of the duct 30. The cooling channels 32 run in a direction generally parallel to the direction of flow of the hot combustion gas being conveyed by the duct 30; i.e. in a direction generally perpendicular to the plane of the paper of FIG. 3. The location of cooling channels 32 in the corners 34 is made possible by fabricating the duct 30 from two panels, an upper panel 36 and a lower panel 38, with the seam welds 40 joining respective opposed left and right side edges 37, 39 of each panel. The terms upper, lower, left and right are used herein to denote only relative opposed locations and not necessarily to limit the orientation of a particular embodiment. Each panel 36, 38 is formed to define corners extending longitudinally in a direction generally parallel to the direction of flow to shape the respective panel into a generally U-shape with respective internal cooling channels 32 extending along the corners 34 generally parallel to the direction of flow of the combustion gas. The welds 40 are thus disposed remote from the formed corners 34 along the duct sidewalls 42 and the cooling channels 32 are effective to adequately cool the entire corner 34. The joined panels 36, 38 define a hot combustion gas passageway 41 having an inlet end 45 of generally circular cross-section conforming to a shape of the combustor outlet and an outlet end 47 of generally rectangular cross-section conforming to a shape of the turbine inlet (FIG. 4B).

Several features of the duct 30 facilitate two-panel construction. First, the minimum radius of curvature of corners 34 is increased when compared to the radius of curvature of the corners 26 of prior art designs. A typical range of radius of curvature $R_1$ for prior art designs may be 15-25 mm, whereas the radius of curvature $R_2$ for ducts built in accordance with the present invention may be at least 35 mm or in the range of 35-50 mm. The increased corner radii result in a reduced stress concentration within the component.

Another feature of the duct 30 that facilitates two-panel construction is a reduced radius of curvature of the duct 30 in the direction of the axis of flow of the combustion gas when compared to prior art designs. This may be more clearly appreciated by comparing the transition ducts 44, 46 of FIGS. 4A and 4B. FIG. 4A illustrates the general contour of a prior art transition duct 44 formed from four panels and having a typical minimum radius of curvature $R_3$ of 100-120 mm, and FIG. 4B illustrates the general contour of a transition duct 46 formed from two panels and having a typical minimum radius of curvature $R_4$ of at least 150 mm or in the range of 150-175 mm. The reduced contour curvature of the present invention also reduces the heat load (heat transfer) into the component slightly.

Two-panel construction is also facilitated by using panels that are thinner than those of prior art ducts. Typical prior art panels have a thickness in the range of 6-8 mm and the panels 36, 38 of the present invention may have a thickness in the range of 4.5-5 mm. Collectively, the changes in the bend radius and the thickness of the panels function to reduce forming strains to a sufficiently low level so that the integrity of the cooling channels 32 in the corners 34 is maintained.

An increase in the corner radius $R_2$ will generally tend to increase the exit flow loss of the gas flowing through the duct 30 due to the resulting restriction of cross-sectional flow area assuming all other dimensions are maintained constant. This exit flow loss may be offset by increasing the arcuate width W of duct 30 when compared to the width of an equivalent prior art duct, thereby recovering cross-sectional flow area that may be lost as a result of an increased corner radii. The arcuate width of a transition duct is limited by the size of the gap G that must be maintained between the exit mouth ends of adjacent transition ducts 48, 50 in the cold/ambient condition in order to accommodate thermal growth of the components. This gap G in prior art designs is generally 40-50 mm. Because the entire width of transition duct 30 of the present invention is effectively cooled, the thermal growth of the duct along the arcuate width axis is reduced when compared to prior art design 10 where portions of the width proximate the corners are not cooled. Accordingly, the required gap G between adjacent ducts built in accordance with the present invention may be less than 40 mm, for example up to as much as 50% less, e.g. in the range of 20-25 mm. In certain embodiments, the increase in cross-sectional flow area that is gained by decreasing the required gap size G is greater than the decrease in cross-sectional flow area that is lost by increasing corner radius R2, thereby providing a net lower exit flow loss.

A two-panel transition duct 30 is less expensive to fabricate because it requires less welding than an equivalent four-panel design. Individual panels having integral cooling channels are fabricated using known processes, such as by forming each panel of at least two layers of material with the cooling channels being formed as grooves in a first layer prior to joining the second layer over the grooved surface. The panels are initially formed flat and are trimmed with a precision cutting process such as laser trimming. The two-panel design requires less laser cutting of panels than a four-panel design. Fit-up problems are also reduced when compared to a four-panel design. As a result of better fit-up, the spacing between adjacent cooling channels 32 may be reduced relative to previous designs, thereby further enhancing the cooling effectiveness, reducing thermal gradients and increasing the low-cycle fatigue life of the component. Prior art designs may use spacing between adjacent cooling channels of 20-25 mm, whereas the spacing for the present invention may be only 10-15 mm in some embodiments.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A transition duct for a gas turbine engine for conducting hot combustion gas along a direction of flow between a combustor outlet and a turbine inlet, the transition duct comprising:

a plurality of panels, each panel formed to define a corner region extending longitudinally in a direction generally parallel to the direction of flow;

a plurality of subsurface cooling channels formed through the corner region of each panel, the cooling channels being part of a closed cooling scheme and extending longitudinally in a direction parallel to the direction of flow and effective to cool the entire respective corner region; and a weld joining edges of adjacent panels remote from the corner region;

an upper panel and a lower panel each formed with two corner regions to define respective U-shapes;

welds joining the upper panel and lower panel along respective opposed edges remote from the corner regions; and further comprising each corner region comprising a minimum radius of curvature of at least 35 mm.

2. The transition duct of claim 1, further comprising:

each corner region comprising a minimum radius of curvature of 35-50 mm;

a radius of curvature of the duct in the direction of flow being within the range of 150-175 mm; and a thickness of each respective panel being in the range of 4.5-5 mm;

wherein the radii of curvature and the thickness are effective to maintain forming strains in the panels to a sufficiently low level so that integrity of the longitudinally extending cooling channels in the corner regions is maintained.

3. The transition duct of claim 1, further comprising each corner region comprising a minimum radius of curvature of 35-50 mm.

4. A transition duct for a gas turbine engine for conducting hot combustion gas along a direction of flow between a combustor outlet and a turbine inlet, the transition duct comprising:

a plurality of panels, each panel formed to define a corner region extending longitudinally in a direction generally parallel to the direction of flow;

a plurality of subsurface cooling channels formed through the corner region of each panel, the cooling channels being part of a closed cooling scheme and extending longitudinally in a direction parallel to the direction of flow and effective to cool the entire respective corner region; and a weld joining edges of adjacent panels remote from the corner region;

an upper panel and a lower panel each formed with two corner regions to define respective U-shapes;

welds joining the upper panel and lower panel along respective opposed edges remote from the corner regions; and further comprising a radius of curvature of the duct in the direction of flow of at least 150 mm.

5. The transition duct of claim 4, further comprising a radius of curvature of the duct in the direction of flow being within the range of 150-175 mm.

6. A transition duct for a gas turbine engine for conducting hot combustion gas along a direction of flow between a combustor outlet and a turbine inlet, the transition duct comprising:

a plurality of panels, each panel formed to define a corner region extending longitudinally in a direction generally parallel to the direction of flow;

a plurality of subsurface cooling channels formed through the corner region of each panel, the cooling channels being part of a closed cooling scheme and extending longitudinally in a direction parallel to the direction of flow and effective to cool the entire respective corner region; and a weld joining edges of adjacent panels remote from the corner region;

an upper panel and a lower panel each formed with two corner regions to define respective U-shapes;

welds joining the upper panel and lower panel along respective opposed edges remote from the corner regions; and further comprising a thickness of each respective panel being in the range of 4.5-5 mm.

7. A gas turbine engine comprising the transition duct of claim 1.

8. A gas turbine engine comprising:

a plurality of combustors each comprising an outlet comprising a circular cross-section;

a turbine comprising an inlet comprising an annular cross-section; and a plurality of transition ducts interconnecting respective combustor outlets with the turbine inlet, each transition duct comprising an inlet comprising a circular cross-section for mating with a respective combustor outlet and comprising a generally rectangular outlet for mating with an arcuate portion of the turbine inlet;

adjacent transition duct outlets being separated by a gap G in a cold condition, gap G being adequate to accommodate thermal growth along an arcuate width W of the respective transition ducts;

a plurality of subsurface cooling channels formed in a longitudinal direction parallel to a direction of flow of combustion gas through each transition duct and spaced along the entire arcuate width W of each transition duct including corner bend regions of the transition duct to effectively cool the entire arcuate width W of each transition duct to control the thermal growth;

further comprising the gap G between each pair of adjacent transition ducts being less than 40 mm.

9. The gas turbine engine of claim 8, further comprising the gap G between each pair of adjacent transition ducts being less than 25 mm.

10. The gas turbine engine of claim 8, further comprising the gap G between each pair of adjacent transition ducts being in the range of 20-25 mm.

11. The gas turbine of claim 8, further comprising a corner region of each transition duct comprising a minimum radius of curvature of at least 35 mm;

a radius of curvature of each transition duct in a direction of flow from the inlet to the outlet being at least 150 mm; and a wall thickness of each respective transition duct being no more than 5 mm;

wherein the radii of curvature and the thickness are effective to maintain forming strains in the panels to a sufficiently low level so that integrity of the longitudinally extending cooling channels in the corner regions is maintained.

12. A gas turbine engine comprising:

a plurality of combustors each comprising an outlet comprising a circular cross-section;

a turbine comprising an inlet comprising an annular cross-section; and a plurality of transition ducts interconnecting respective combustor outlets with the turbine inlet, each transition duct comprising an inlet comprising a circular cross-section for mating with a respective combustor outlet and comprising a generally rectangular outlet for mating with an arcuate portion of the turbine inlet;

adjacent transition duct outlets being separated by a gap G in a cold condition, gap G being adequate to accommodate thermal growth along an arcuate width W of the respective transition ducts;

a plurality of subsurface cooling channels formed in a longitudinal direction parallel to a direction of flow of combustion gas through each transition duct and spaced along the entire arcuate width W of each transition duct including corner bend regions of the transition duct to effectively cool the entire arcuate width W of each transition duct to control the thermal growth;

further comprising a corner region of each transition duct comprising a minimum radius of curvature in the range of 35-50 mm.

13. A gas turbine engine comprising:

a plurality of combustors each comprising an outlet comprising a circular cross-section;

a turbine comprising an inlet comprising an annular cross-section; and a plurality of transition ducts interconnecting respective combustor outlets with the turbine inlet, each transition duct comprising an inlet comprising a circular cross-section for mating with a respective combustor outlet and comprising a generally rectangular outlet for mating with an arcuate portion of the turbine inlet;

adjacent transition duct outlets being separated by a gap G in a cold condition, gap G being adequate to accommodate thermal growth along an arcuate width W of the respective transition ducts;

a plurality of subsurface cooling channels formed in a longitudinal direction parallel to a direction of flow of combustion gas through each transition duct and spaced along the entire arcuate width W of each transition duct including corner bend regions of the transition duct to effectively cool the entire arcuate width W of each transition duct to control the thermal growth;

further comprising a radius of curvature of each transition duct in a direction of flow from the inlet to the outlet in the range of 150-175 mm.

14. A gas turbine engine comprising:

a plurality of combustors each comprising an outlet comprising a circular cross-section;

a turbine comprising an inlet comprising an annular cross-section; and a plurality of transition ducts interconnecting respective combustor outlets with the turbine inlet, each transition duct comprising an inlet comprising a circular cross-section for mating with a respective combustor outlet and comprising a generally rectangular outlet for mating with an arcuate portion of the turbine inlet;

adjacent transition duct outlets being separated by a gap G in a cold condition, gap G being adequate to accommodate thermal growth along an arcuate width W of the respective transition ducts;

a plurality of subsurface cooling channels formed in a longitudinal direction parallel to a direction of flow of combustion gas through each transition duct and spaced along the entire arcuate width W of each transition duct including corner bend regions of the transition duct to effectively cool the entire arcuate width W of each transition duct to control the thermal growth;

further comprising a wall thickness of each respective transition duct being in the range of 4.5-5 mm.

* * * * *